May 7, 1963 F. G. FOOTE ET AL 3,088,891
FUEL ELEMENTS FOR NEUTRONIC REACTORS
Filed March 4, 1949 3 Sheets-Sheet 1

INVENTORS:
Eric R. Jette
BY Frank G. Foote

Roland A. Anderson
Attorney

INVENTORS:
Eric R. Jette
Frank G. Foote
BY
Roland A. Anderson
Attorney

INVENTORS:
Eric R. Jette
Frank G. Foote
BY Roland A. Anderson
Attorney.

United States Patent Office 3,088,891
Patented May 7, 1963

3,088,891
FUEL ELEMENTS FOR NEUTRONIC REACTORS
Frank G. Foote, Chicago, Ill., and Eric R. Jette, Los Alamos, N. Mex., assignors to the United States of America as represented by the United States Atomic Energy Commission
Filed Mar. 4, 1949, Ser. No. 79,703
2 Claims. (Cl. 204—154.2)

This invention relates to neutronic reactors. More specifically the invention relates to an improved fuel element structure for neutronic reactors.

As is by now well known, in a neutronic reactor, a chain reaction occurs by fission of a thermally fissionable material (i.e. a material containing an isotope fissionable by thermal neutrons). In the so-called "thermal" reactor, the chain reaction is sustained by fission of the thermally fissionable isotopic content of the thermally fissionable material by thermal neutrons, i.e. neutrons having no energy other than that which they possess by reason of temperature. In such reactors, there is incorporated a moderator material in which the fissionable material is dispersed, either homogeneously or as aggregated bodies. In the "fast" reactor, little or no moderator is incorporated, and the chain reaction is maintained by fission caused by "fast" neutrons, i.e. neutrons of high energy. Reactors may also be so designed that the bulk of the nuclear fissions are produced by neutrons of intermediate energies.

It will be understood that the present invention is not concerned with the nuclear phenomena by which a chain reaction is obtained, nor with such design features as critical dimensions, purity, choice of moderator or fissionable material, or the pattern or "geometry" in which the fissionable material is disposed in order to produce the chain reaction. Such criteria for the operativeness of a neutronic reactor are now well known to persons skilled in the neutronic reactor art, and are disclosed in the copending application of Enrico Fermi and Leo Szilard, Serial No. 568,904, filed December 19, 1944, now Patent No. 2,708,656, issued on May 17, 1955.

Neutronic reactors are commonly cooled by heat exchange between the fissionable material and a fluid coolant, which is flowed through the reactor and externally cooled. In order that the fissionable material not be chemically affected by the coolant, and in order that the coolant not become contaminated with fissionable material or with highly radioactive fission products, the fissionable material which is usually called a slug is usually insulated from flowing coolant by a barrier such as a jacket or can. The jacket or can must be of a thermally conductive material in order to preserve a high rate of heat exchange between the fissionable material and the coolant. In addition the material of the jacket or can must have a relatively low cross-section for capture of neutrons, in order that the chain reaction not be prevented by high neutron absorption in non-fissionable materials. Aluminum and stainless steel are commonly employed as such jacketing materials. Neither the choice of jacketing material, nor the maximum thickness or minimum purity thereof required in order that the chain reaction may be maintained constitutes any portion of the present invention, being determinable in accordance with criteria set forth in the copending application referred to above, and now well known in the neutronic reactor art.

Where the fissionable material is incorporated in the jacket and operation at any considerable level of power (heat generation in the fissionable material) is required, it is necessary that the fissionable material be "bonded" to the jacket in order that uniform heat transfer be maintained. In the absence of such bonding, or in the event of development of defects in the bonding so provided, "hot spots" will develop at the surface of the fissionable material at points where the heat transfer is inadequate, and the fissionable material may melt or suffer undesirable chemical reactions with the bonding material or the jacket. The provision of a suitable bond for maintaining heat transfer between the fissionable material and the jacket, and thus between the fissionable material and the coolant, has been one of the major problems in the design and construction of neutronic reactors.

Accordingly, it is the principal object of the present invention to provide an improved form of bond or heat transfer medium between a body of fissionable material and a jacket or can enclosing such material, for use in a neutronic reactor. The invention will best be understood by description of a single embodiment thereof as illustrated by the attached drawing, in which.

Figure 1:
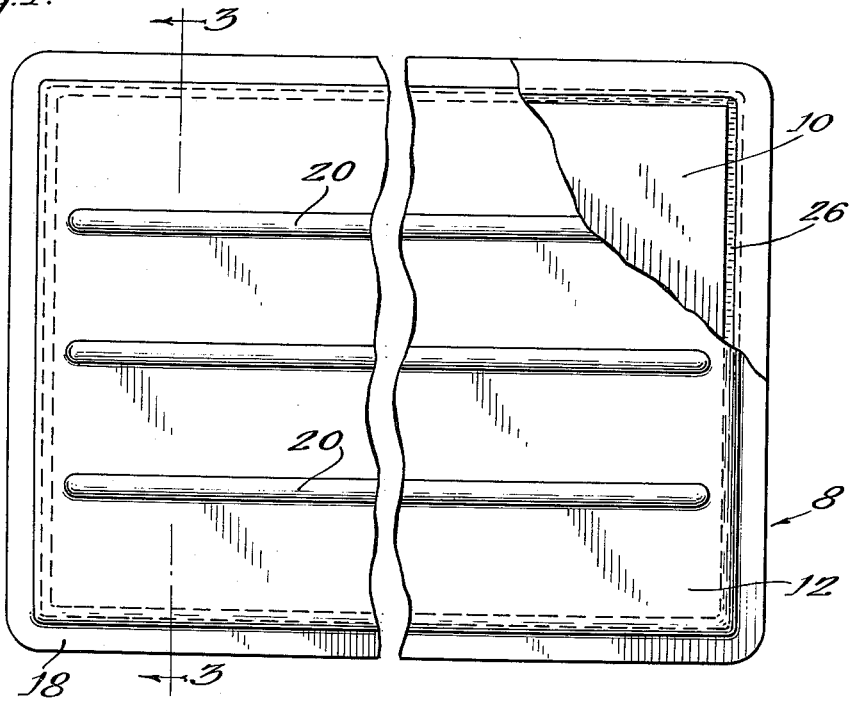
FIG. 1 is a plan view, partially broken away, of a reactor fuel element embodying the invention.
Figure 2:
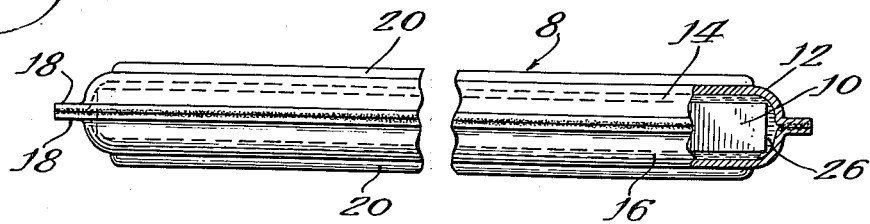
FIG. 2 is a side elevation, partially broken away, of the fuel element of FIG. 1.
Figure 3:
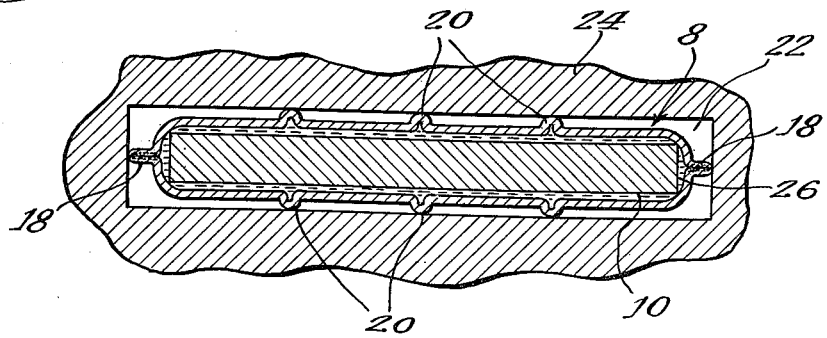
FIG. 3 is a cross-sectional view of the fuel element of FIG. 1 illustrating the placing of the fuel element in a coolant channel of a neutronic reactor.

The jacketed fuel element 8 of FIGS. 1, 2, and 3 is a flat rectangular slab 10 of natural or isotopically enriched uranium or plutonium encased in a jacket 12 of aluminum or stainless steel. The jacket 12 is formed of an upper recessed member 14 and a lower recessed member 16, both of which have flanges 18, the flanges 18 being super-imposed and being welded all around the perimeter to form a pressure-tight jacket for the uranium body 10. The jacket 12 is provided with longitudinal ribs 20 on the upper and lower surfaces. All voids within the jacket 12 left unoccupied by the fissionable material 10 are filled with a thermally conductive liquid 26. The filling and sealing may be accomplished by first welding three edges of the jacket 12, then inserting a fine needle through the unwelded edge with the unwelded edge placed uppermost, filling the jacket 12 under pressure slightly greater than atmospheric pressure, and finally completing the closure by welding. Preferably precautions are taken to avoid the entrapment of air within the jacket 12.

Preferably the liquid which establishes thermal contact between the uranium body 10 and the jacket 12 is a thermally conducting metal having a melting point lower than 100° C. It is also desirable that the bonding material have low neutron adsorption characteristics. Exemplary of such metals are sodium and sodium-potassium alloys.

Figure 6:
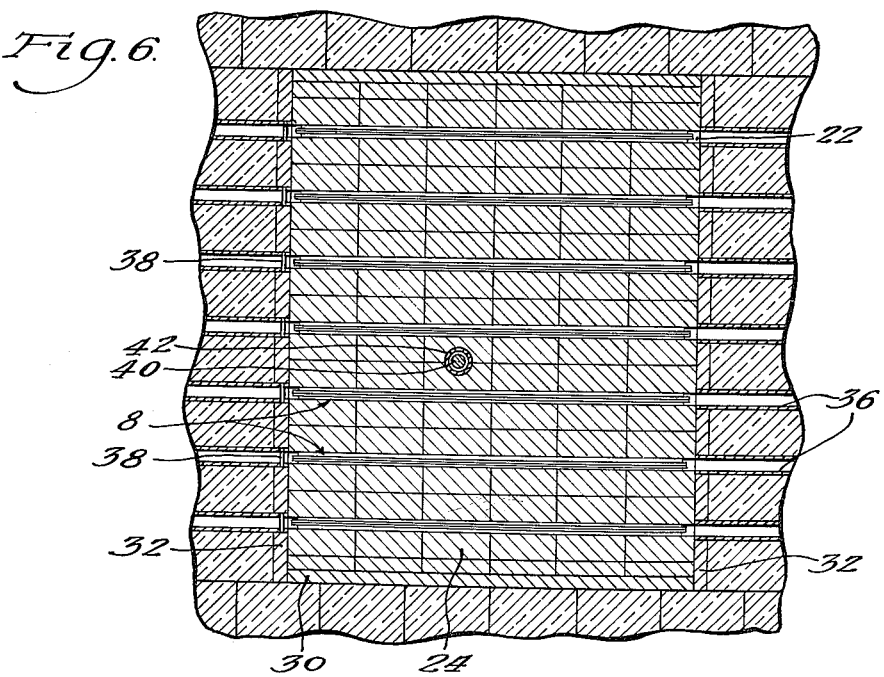
FIG. 6 is a vertical sectional view taken along the line 6—6 of FIG. 4.
Figure 5:
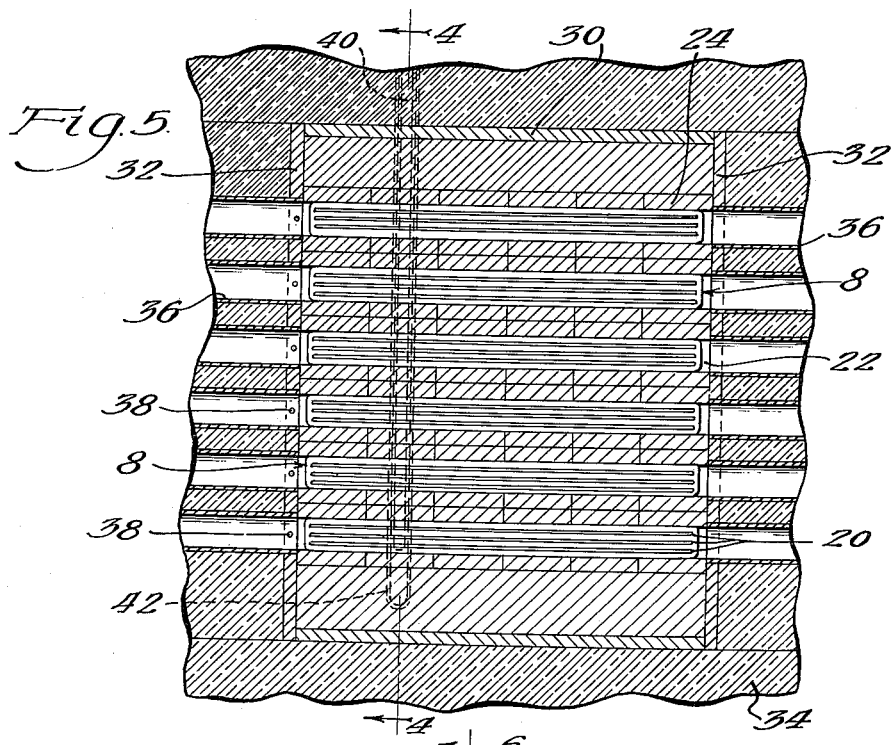
FIG. 5 is a plan section of the reactor of FIG. 4 taken along the line 5—5 in the direction indicated by arrows.
Figure 4:
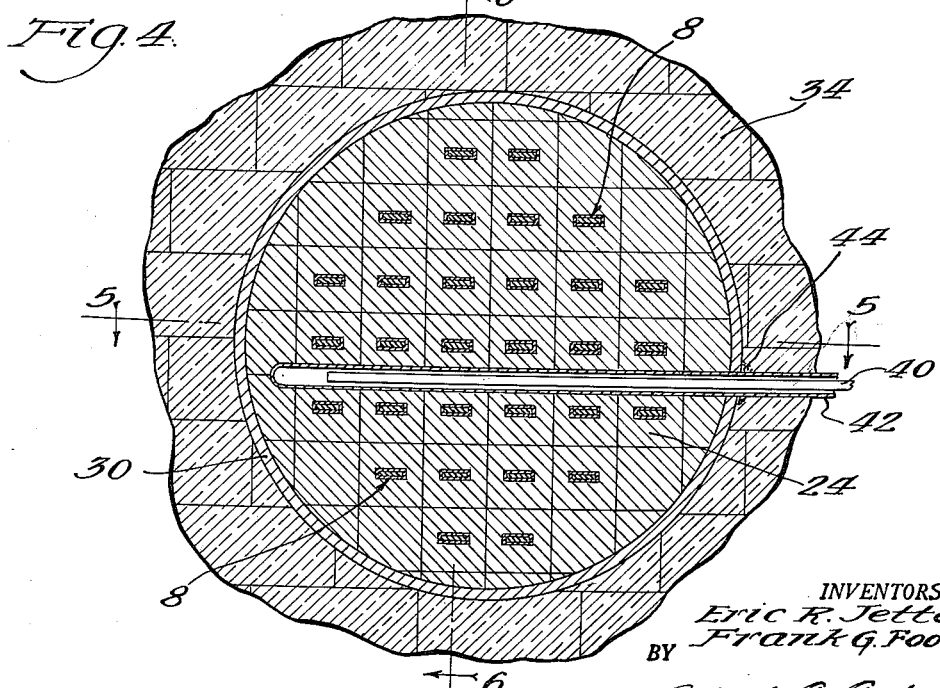
FIG. 4 is a fragmentary cross-sectional view of a neutronic reactor incorporating the fuel element of FIG. 1.

FIGS. 4, 5 and 6 illustrate schematically a neutronic reactor incorporating the fuel element described above. The active portion of the reactor is enclosed within a cylindrical pressure shell 30 having end walls 32. The pressure shell 30 is surrounded by a neutron reflector 34, for example of graphite. Within the shell 30 is a mass 24 of a moderator material such as beryllium. Coolant flow and fuel passages 22, rectangular in cross section, extend through the moderator mass 24. The jacketed fuel members 8 are placed within the passages 22, as shown in detail in FIG. 3. The end walls 32 of the pressure shell 30 are apertured to receive rectangular pipes 36 which form inlet and outlet passages to the respective coolant and fuel channels 22. The coolant pipes 36 are joined to the end walls 32 of the shell 30 in pressure-tight fashion, as by welding. At the outlet end of each channel 22 is positioned a vertical pin 38 which retains the jacketed fuel member 8 within the shell 30 against the pressure of the coolant. It will be understood that the coolant is not illustrated in the drawing, the choice of coolant, like the choice of fissionable material, jacketing material, dimensions, and critical size being by now well within the skill of the art.

As is likewise indicated schematically in the drawing, there is provided a control rod 40 of a neutron absorbing material, such as boron, cadmium, or compounds thereof, which protrudes into the shell 30 and which may be inserted or withdrawn to reduce or increase the reactivity of the reactor. The control rod 40 operates in a well 42 which enters the shell 30 through a pressure-tight welded seal at 44. The control rod 40 may be cooled by the flowing of helium in the well 42.

By incorporation of the liquid metal bond 26 there are eliminated the problems which arise with the bonding agents heretofore employed. The liquefiable metal bond is self-healing and effectively acts to prevent the development of faulty portions of the thermal bonding between the body of fissionable material 10 and the jacket 12. Although, as stated above, the metal of the bond 26 preferably has a melting point below 100° C., it will be understood that it is within the purview of the invention to employ a metal of higher melting point and to operate the neutronic reactor at a temperature above the melting point of the material of the bond 26 but below the melting point of the fissionable body 10 or the jacket 12.

Persons skilled in the art will readily understand that the embodiment of the invention herein illustrated is only one of a vast number of fuel elements employing the liquid bond of the invention, and of reactors employing such fuel elements, which may readily be designed. A single embodiment has herein been illustrated and described in accordance with the patent statutes. However the extent of patent protection to be accorded the invention should be determined not by the particular embodiment herein disclosed, but by the claims hereto appended.

What is claimed is:
1. As an article of manufacture, a slug jacket containing a unitary core of fissionable material and a liquefiable metal bond of a metal of the group consisting of sodium and sodium-potassium alloys.
2. As an article of manufacture, a slug jacket containing a unitary core of thermally fissionable material surrounded by a liquefiable metal bond of a sodium-potassium alloy.

References Cited in the file of this patent
UNITED STATES PATENTS

| 1,202,162 | Clay | Oct. 24, 1916 |

FOREIGN PATENTS

| 233,011 | Switzerland | Oct. 2, 1944 |
| 861,390 | France | Feb. 7, 1941 |

OTHER REFERENCES

Smyth: A General Account of the Development of Method of Using Atomic Energy for Military Purposes Under the Auspices of the United States Government, 1940–1945, pp. 84 and 106. Publ. Aug. 11–12, 1945, U.S. Government Printing Office.

Kelly et al.: Phy. Rev. 73, 11–35–9 (1948).

Liquid-Metals Handbook, Navexos, p. 733, June 1, 1950, Atomic Energy Commission—Department of the Navy, first edition, pp. 46, 47.